(12) United States Patent
Shimauchi

(10) Patent No.: US 11,964,537 B2
(45) Date of Patent: Apr. 23, 2024

(54) VEHICLE AIR CONDITIONING DEVICE

(71) Applicant: TOYOTA JIDOSHA KABUSHIKI KAISHA, Toyota (JP)

(72) Inventor: Takayuki Shimauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 17/480,518

(22) Filed: Sep. 21, 2021

(65) Prior Publication Data

US 2022/0088993 A1    Mar. 24, 2022

(30) Foreign Application Priority Data

Sep. 24, 2020  (JP) .................................. 2020-159286

(51) Int. Cl.
*B60H 1/00* (2006.01)
*B60H 1/32* (2006.01)

(52) U.S. Cl.
CPC ..... *B60H 1/00807* (2013.01); *B60H 1/00735* (2013.01); *B60H 1/0075* (2013.01); *B60H 1/00921* (2013.01); *B60H 1/3205* (2013.01); *B60H 2001/00928* (2013.01); *B60H 2001/00949* (2013.01); *B60H 2001/3251* (2013.01)

(58) Field of Classification Search
None
See application file for complete search history.

(56) References Cited

U.S. PATENT DOCUMENTS

| | | | | |
|---|---|---|---|---|
| 4,932,220 A | * | 6/1990 | Inoue | F24F 11/88 62/226 |
| 2002/0036080 A1 | * | 3/2002 | Itoh | F25B 41/385 165/231 |
| 2002/0184899 A1 | * | 12/2002 | Togaru | B60H 1/3208 62/133 |
| 2005/0235668 A1 | * | 10/2005 | Huang | B60H 1/0075 62/211 |
| 2016/0177808 A1 | * | 6/2016 | Hosokawa | F01P 7/162 123/41.08 |
| 2020/0298665 A1 | | 9/2020 | Nakazawa et al. | |

FOREIGN PATENT DOCUMENTS

| | | | |
|---|---|---|---|
| JP | 7-232539 A | | 9/1995 |
| JP | 2001-324237 A | | 11/2001 |
| JP | 2006-224825 A | | 8/2006 |
| JP | 2019-010997 A | | 1/2019 |
| JP | 2019-104393 A | | 6/2019 |
| WO | WO 2017/163687 | * | 9/2017 |

* cited by examiner

*Primary Examiner* — Kidest Bahta

(74) *Attorney, Agent, or Firm* — Dinsmore & Shohl LLP

(57) ABSTRACT

Disclosed is a vehicle air conditioning device including a heat pump cycle configured to compress and expand a refrigerant; a heater core; a high pressure side pressure sensor configured to detect a pressure on the high pressure side of the heat pump cycle; and a heater core inlet water temperature sensor configured to detect a temperature of cooling water at an inlet of the heater core as a heater core inlet water temperature. The heat pump cycle includes a compressor; a condenser; a water refrigerant heat exchanger and an evaporator; and a heating expansion valve and a cooling expansion valve. An estimated outside air temperature is calculated based on the high pressure side pressure detected by the high pressure side pressure sensor and the heater core inlet water temperature detected by the heater core inlet water temperature sensor.

7 Claims, 11 Drawing Sheets

VEHICLE AIR CONDITIONING DEVICE

CROSS REFERENCE TO RELATED APPLICATION

This application claims priority to Japanese Patent Application No. 2020-159286 filed on Sep. 24, 2020, which is incorporated herein by reference in its entirety including the specification, claims, drawings, and abstract.

TECHNICAL FIELD

The present disclosure relates to a vehicle air conditioning device and, in particular, to a structure of a vehicle air conditioning device in which an outside air temperature is estimated and the estimated temperature is used in air conditioning control.

BACKGROUND

While vehicle air conditioning devices typically control air conditioning such as cooling or heating based on an outside air temperature detected by an outside air temperature sensor, providing an outside air temperature sensor is costly. To reduce costs, there has been proposed a vehicle air conditioning device that creates a comfortable environment for vehicle occupants without using an outside air temperature sensor by detecting a refrigerant pressure of a cooling cycle, determining, based on the refrigerant pressure, whether or not the outside air temperature is below a certain value, and increasing the heating power when the outside air temperature is determined to be low (see, for example, JP 2006-224825 A).

SUMMARY

A conventional outside air temperature sensor is often installed in a front compartment that is located toward the front of a vehicle. As the front compartment houses the powertrain including an engine and a motor, the influence of hot air coming from these components may result in failure to accurately detect the outside air temperature when there is no airflow as would occur while the vehicle is traveling.

As the outside air temperature detected by the outside air temperature sensor is used for controlling air conditioning such as cooling or heating, a failure to accurately detect the outside air temperature may reduce user comfort or fuel efficiency. This creates a demand for estimating the outside air temperature without using the outside air temperature sensor when the outside air temperature sensor is unable to detect the outside air temperature accurately.

In this regard, JP 2006-224825 A proposes a method of estimating the outside air temperature based on refrigerant pressure. However, although this method enables detection of whether or not the outside air temperature is lower than a predetermined temperature, the outside air temperature estimation accuracy requires improvement as the accuracy of controlling air conditioning using the estimated outside air temperature is less than when using the outside air temperature as detected by the outside air temperature sensor.

The present disclosure is directed toward accurately estimating an outside air temperature without using an outside air temperature sensor.

According to an aspect of the present disclosure, there is provided a vehicle air conditioning device comprising an air conditioning cycle configured to compress and expand a refrigerant, the air conditioning cycle comprising a compressor configured to compress the refrigerant; an exterior heat exchanger through which the refrigerant circulates; an interior heat exchanger through which the refrigerant circulates; and an expansion valve configured to expand the compressed refrigerant; a heater core through which a second refrigerant circulates, the heater core being configured to heat air that is to be supplied to a vehicle cabin; a high pressure side pressure sensor configured to detect a pressure on the high pressure side of the air conditioning cycle; and a heater core inlet refrigerant temperature sensor configured to detect a temperature of the second refrigerant at an inlet of the heater core as a heater core inlet refrigerant temperature, wherein an estimated outside air temperature is calculated based on the high pressure side pressure of the air conditioning cycle detected by the high pressure side pressure sensor and the heater core inlet refrigerant temperature detected by the heater core inlet refrigerant temperature sensor.

The high pressure side pressure of the air conditioning cycle has a certain correlation relationship with the outside air temperature. The heater core inlet refrigerant temperature is also correlated with the outside air temperature. Therefore, as an outside air temperature estimated based on the high pressure side pressure is corrected based on the heater core inlet refrigerant temperature, the estimation accuracy of the outside air temperature can be improved.

According to another aspect of the present disclosure, the vehicle air conditioning device includes a solar radiation sensor configured to detect an amount of solar radiation. An estimated outside air temperature may be calculated based on the high pressure side pressure of the air conditioning cycle detected by the high pressure side pressure sensor, the heater core inlet refrigerant temperature detected by the heater core inlet refrigerant temperature sensor, and the amount of solar radiation detected by the solar radiation sensor.

The amount of solar radiation is correlated with the outside air temperature. As an outside air temperature estimated based on the high pressure side pressure is corrected based on the heater core inlet refrigerant temperature and the amount of solar radiation, the estimation accuracy of the outside air temperature can be further improved.

According to still another aspect of the present disclosure, the vehicle air conditioning device includes a first map that represents a relationship between the high pressure side pressure and an outside air temperature; and a second map for converting the heater core inlet refrigerant temperature to a first correction outside air temperature. An estimated outside air temperature may be calculated based on the outside air temperature calculated using the first map and the first correction outside air temperature calculated using the second map.

As such, the estimation accuracy of the outside air temperature can be improved with a simple structure.

According to still another aspect of the present disclosure, the vehicle air conditioning device includes a first map that represents a relationship between the high pressure side pressure and an outside air temperature; a second map for converting the heater core inlet refrigerant temperature to a first correction outside air temperature; and a third map for converting the amount of solar radiation to a second correction outside air temperature. An estimated outside air temperature may be calculated based on the outside air temperature calculated using the first map, the first correction outside air temperature calculated using the second map, and the second correction outside air temperature calculated using the third map.

As such, the estimation accuracy of the outside air temperature can be improved with a simple structure.

According to still another aspect of the present disclosure, the vehicle air conditioning device includes an outside air temperature sensor configured to detect an outside air temperature. When an outside air temperature is updated with the outside air temperature detected by the outside air temperature sensor every predetermined period of time, a temperature or a flow rate of air that is to be blown into the vehicle cabin may be adjusted based on the updated outside air temperature, and, when the outside air temperature is not updated with the outside air temperature detected by the outside air temperature sensor and a vehicle traveling speed is lower than a predetermined threshold value, the temperature or the flow rate of air that is to be blown into the vehicle cabin may be adjusted based on the calculated estimated outside air temperature.

As described above, when the outside air temperature is not updated with the outside air temperature detected by the outside air temperature sensor as it is determined to be inaccurate, the temperature or the flow rate of air that is to be blown into the vehicle cabin is adjusted based on the calculated estimated outside air temperature rather than the outside air temperature detected by the outside air temperature sensor. As such, even when the outside air temperature detected by the outside air temperature sensor is determined to be inaccurate, air conditioning control can be performed in a manner that avoids impairment of user comfort and that suppresses a reduction in fuel efficiency.

The present disclosure enables accurately estimating an outside air temperature without using an outside air temperature sensor.

BRIEF DESCRIPTION OF DRAWINGS

Embodiments of the present disclosure will be described based on the following figures, wherein.

DESCRIPTION OF EMBODIMENTS

Figure 1:
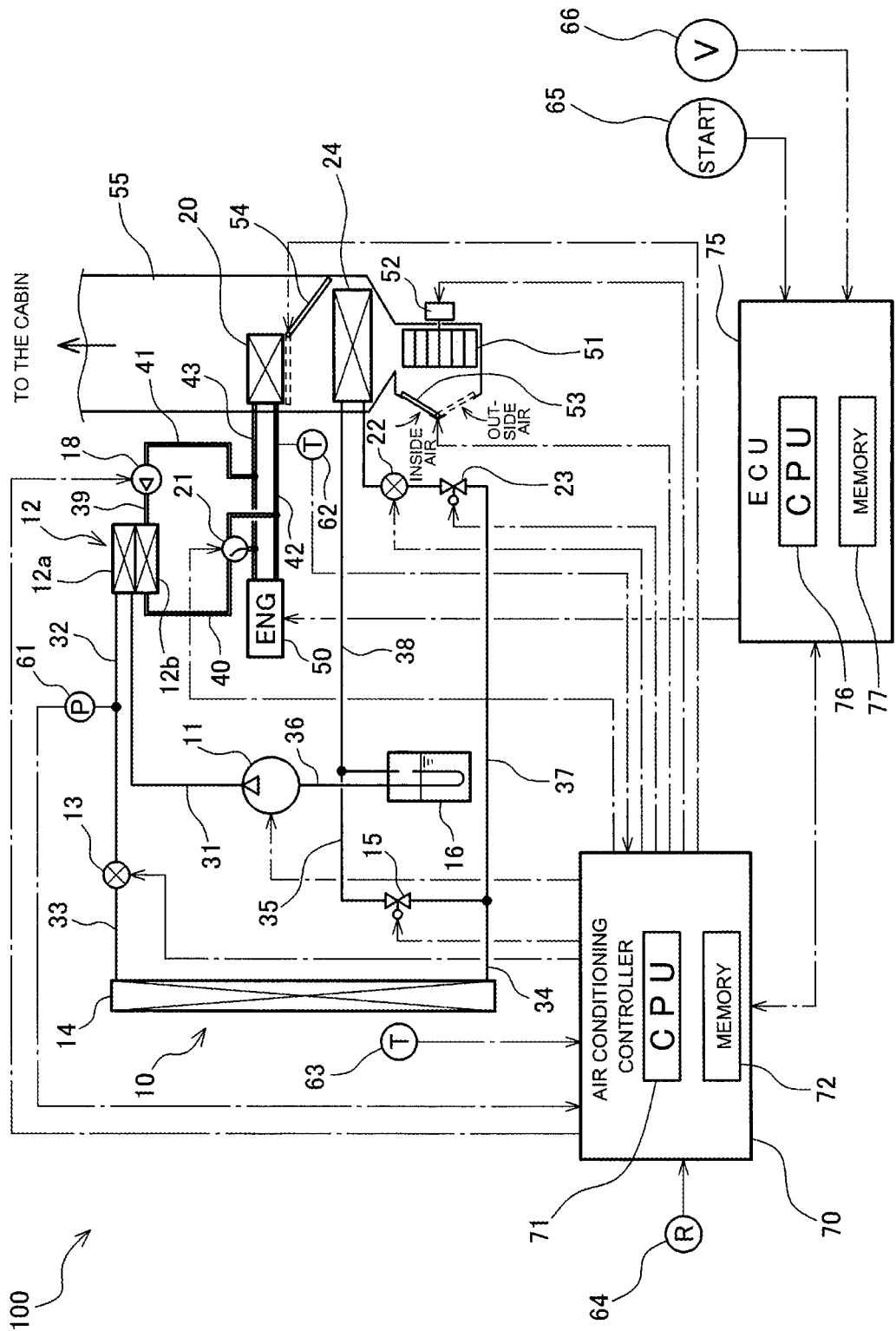
FIG. 1 is a schematic diagram that illustrates a structure of a vehicle air conditioning device according to an embodiment.

A vehicle air conditioning device 100 according to an embodiment will be described below with reference to the accompanying drawings. The vehicle air conditioning device 100 illustrated in FIG. 1 includes a heat pump cycle 10 that serves as an air conditioning cycle. The heat pump cycle 10 includes a compressor 11, a water refrigerant heat exchanger 12, a heating expansion valve 13, a condenser 14, a heating solenoid valve 15, an accumulator tank 16, a cooling expansion valve 22, a cooling solenoid valve 23, and an evaporator 24. The heat pump cycle 10 is capable of both a cooling operation and a heating operation by causing the heating solenoid valve 15 and the cooling solenoid valve 23 to open or close. The vehicle air conditioning device 100 also includes a heater core 20, a cooling water pump 18, a duct 55, a fan 51, dampers 53 and 54, and an air conditioning controller 70.

The compressor 11 is a device that compresses a refrigerant. The water refrigerant heat exchanger 12 includes a refrigerant flow path 12a through which a refrigerant flows, and a cooling water flow path 12b through which cooling water flows, the cooling water being a second refrigerant that circulates through the heater core 20. The water refrigerant heat exchanger 12 exchanges heat between the refrigerant and the cooling water. The heating expansion valve 13 expands the compressed refrigerant and causes it to flow into the condenser 14. The condenser 14 is disposed in a front compartment (not illustrated) of a vehicle and serves as a heat exchanger through which the expanded refrigerant or the compressed refrigerant circulates, and which exchanges heat between the refrigerant and outside air. The condenser 14 constitutes an exterior heat exchanger. The heating solenoid valve 15 is open during the heating operation and is closed during the cooling operation. The accumulator tank 16 stores the refrigerant that is to be drawn into the compressor 11. The cooling expansion valve 22 expands the compressed refrigerant and causes it to flow into the evaporator 24. The evaporator 24 is disposed in the duct 55 and serves as a heat exchanger that exchanges heat between the refrigerant and vehicle interior air or outside air that is blown by the fan 51, thereby cooling air that is to be supplied to a vehicle cabin. The cooling solenoid valve 23 is open during the cooling operation and is closed during the heating operation. The water refrigerant heat exchanger 12 and the evaporator 24 constitute an interior heat exchanger.

The heater core 20 is disposed in the duct 55 and serves as a heat exchanger through which the cooling water circulates, the cooling water being the second refrigerant that has been subjected to heat exchange with the hot refrigerant at the water refrigerant heat exchanger 12, and which exchanges heat between the cooling water and air that is to flow into the vehicle cabin, thereby heating the air that is to flow into the vehicle cabin. By switching a three-way valve 21, cooling water that has been heated in an engine 50 can also be made to flow into the heater core 20. The cooling water pump 18 causes the cooling water to cycle between the cooling water flow path 12b of the water refrigerant heat exchanger 12 and the heater core 20. The damper 53 is installed at an inlet of the duct 55 and switches air that is to be drawn by the fan 51 between air inside the vehicle cabin (inside air) and outside air. The damper 54 switches between a flow path in which air coming from the fan 51 passes through the heater core 20 and a flow path in which air coming from the fan 51 does not pass through the heater core 20.

A portion extending from the compressor 11 through the refrigerant flow path 12*a* of the water refrigerant heat exchanger 12 to the heating expansion valve 13 is on the high pressure side of the heat pump cycle 10, where the pressure is high regardless of whether the cooling operation or the heating operation is being performed. A high pressure side pressure sensor 61 is installed between the refrigerant flow path 12*a* and the heating expansion valve 13. A heater core inlet water temperature sensor 62 for detecting a temperature of cooling water that is to flow into the heater core 20 is installed at a heater core inlet tube 42 of the heater core 20. The heater core inlet water temperature sensor 62 serves as a heater core inlet refrigerant temperature sensor. An outside air temperature sensor 63 for detecting a temperature of outside air is installed more toward the front of the vehicle than the condenser 14 in the front compartment (not illustrated) of the vehicle. A solar radiation sensor 64 for detecting an amount of solar radiation is installed on the vehicle.

The air conditioning controller 70 is a computer that includes therein a CPU 71 serving as a processor for performing information processing and a memory 72 for storing a control program and control data. The high pressure side pressure sensor 61, the heater core inlet water temperature sensor 62, the outside air temperature sensor 63, and the solar radiation sensor 64 are connected to the air conditioning controller 70, and detection data from the sensors 61 to 64 are input to the air conditioning controller 70. The compressor 11, the heating expansion valve 13, the heating solenoid valve 15, the cooling water pump 18, the three-way valve 21, the cooling expansion valve 22, the cooling solenoid valve 23, a fan motor 52, and the dampers 53 and 54 are connected to the air conditioning controller 70, and operate upon commands from the air conditioning controller 70.

The vehicle that is equipped with the vehicle air conditioning device 100 includes the engine 50, a drive motor (not illustrated), and an electronic control unit 75 (hereinafter referred to as ECU 75). The ECU 75 is a computer that includes therein a CPU 76 serving as a processor for performing information processing and a memory 77 for storing a control program and control data. The engine 50 and the motor are connected to the ECU 75 and are controlled upon commands from the ECU 75. A start switch 65 for starting up the vehicle and a vehicle speed meter 66 for detecting a speed of the vehicle are installed on the vehicle. The start switch 65 is connected to the ECU 75, and when the start switch 65 is turned on, a motor drive power supply is turned on, bringing the vehicle into a drivable state. The vehicle speed meter 66 detects a speed of the vehicle and inputs it to the ECU 75. The air conditioning controller 70 of the vehicle air conditioning device 100 is connected to the ECU 75 and transmits and receives, to and from the ECU 75, various data including on/off data for the start switch 65 and vehicle speed data detected by the vehicle speed meter 66.

Figure 2:
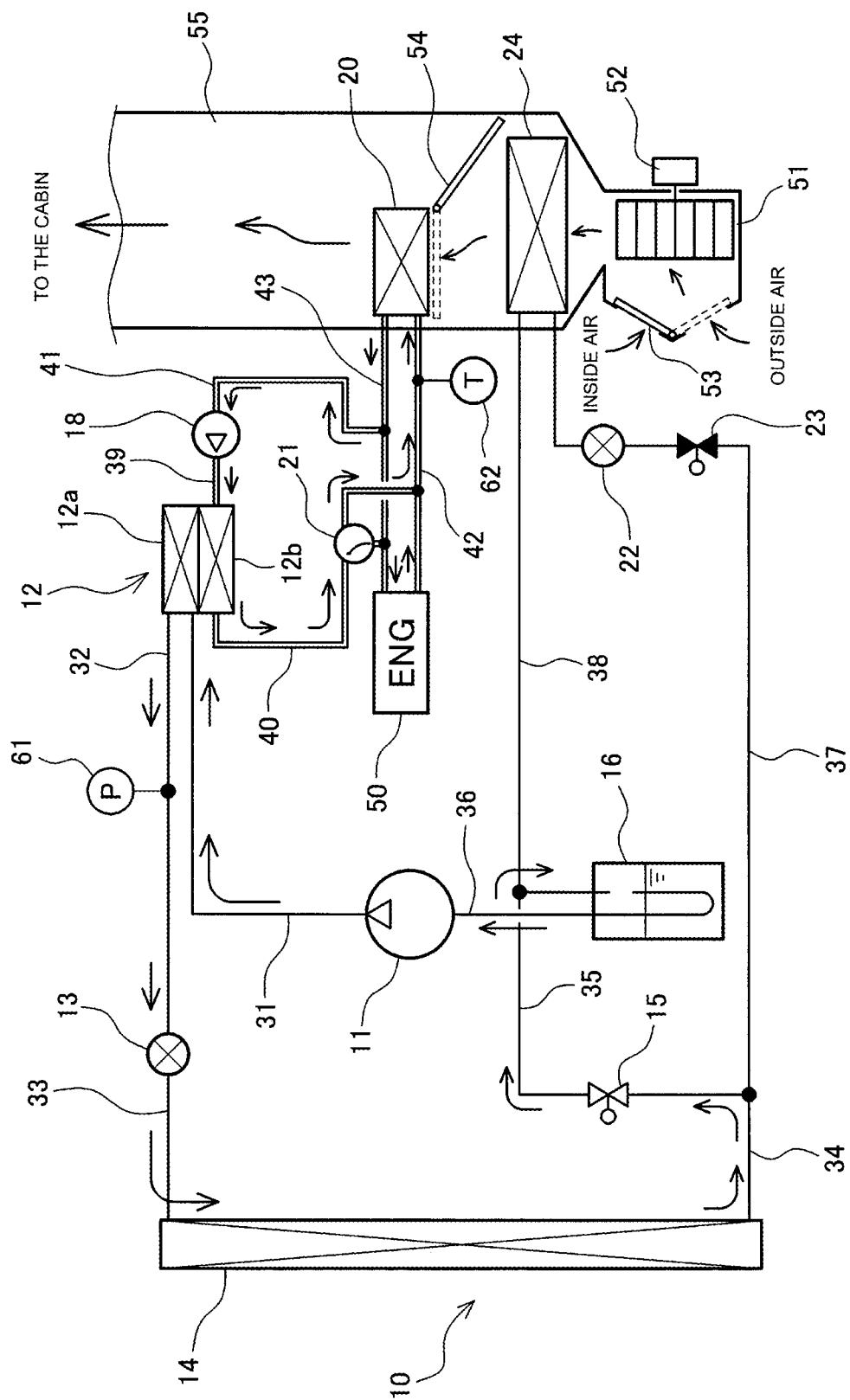
FIG. 2 is a schematic diagram that illustrates a manner in which a refrigerant flows when the vehicle air conditioning device illustrated in FIG. 1 performs a heating operation.
Figure 3:
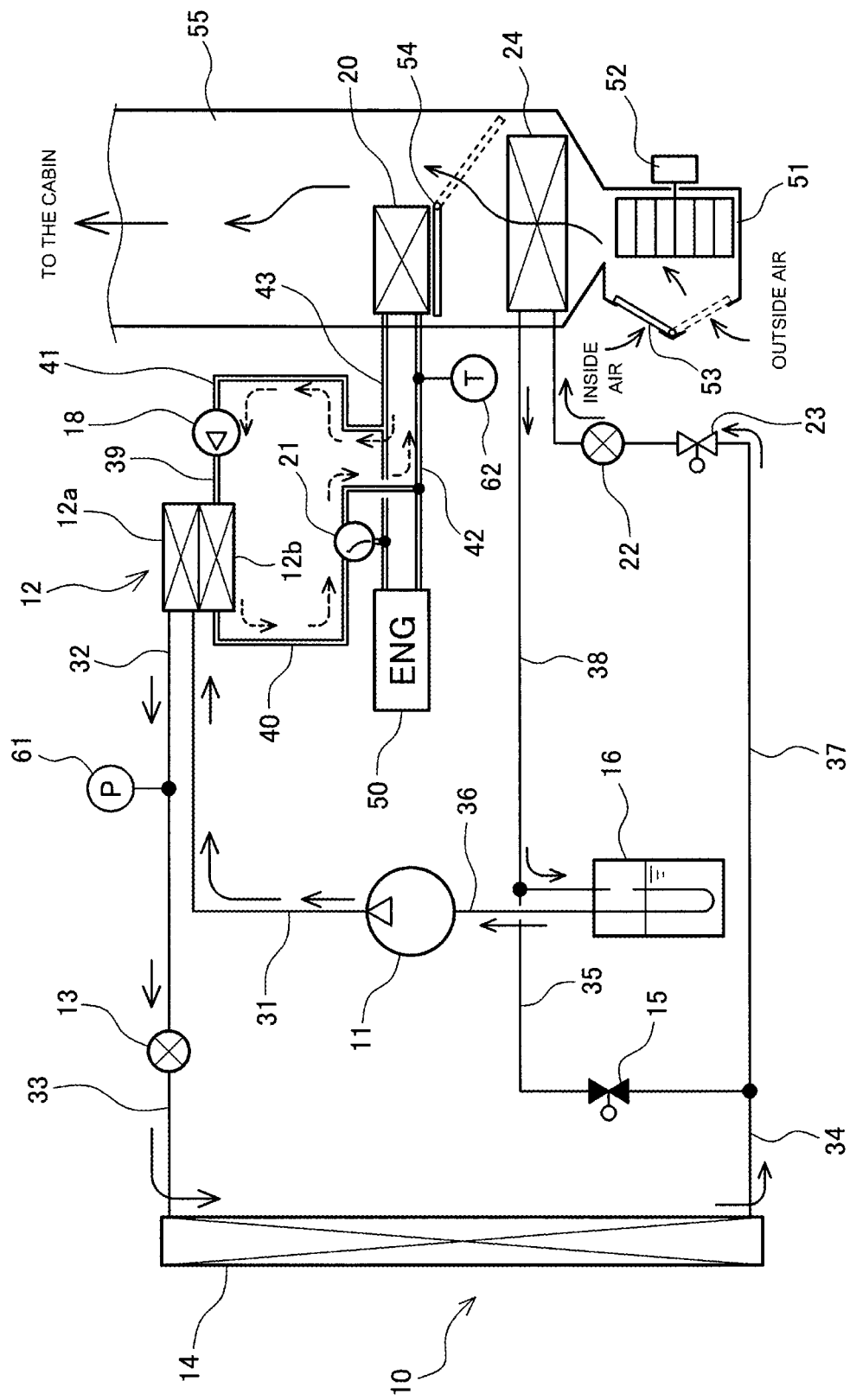
FIG. 3 is a schematic diagram that illustrates a manner in which a refrigerant flows when the vehicle air conditioning device illustrated in FIG. 1 performs a cooling operation.

Referring to FIGS. 2 and 3, how the refrigerant and the cooling water flow during the heating operation and during the cooling operation will be described below. Referring first to FIG. 2, how they flow during the heating operation will be described below.

As illustrated in FIG. 2, during the heating operation, the heating solenoid valve 15 is open, and the cooling solenoid valve 23 is closed. As illustrated by arrows in FIG. 2, the high-temperature and high-pressure refrigerant that has been compressed by the compressor 11 flows into the refrigerant flow path 12*a* of the water refrigerant heat exchanger 12.

The refrigerant that has passed through the refrigerant flow path 12*a* of the water refrigerant heat exchanger 12 exchanges heat in the water refrigerant heat exchanger 12 with the cooling water that circulates through the heater core 20 as will be described later, causing a drop in temperature. The refrigerant having a lowered temperature then flows from the refrigerant flow path 12*a* of the water refrigerant heat exchanger 12 through a water refrigerant heat exchanger outlet tube 32 into the heating expansion valve 13. The refrigerant expands in the heating expansion valve 13, which causes a further drop in temperature, and the refrigerant that is in a low temperature state flows through a condenser inlet tube 33 into the condenser 14. The refrigerant exchanges heat in the condenser 14 with outside air having a higher temperature than the refrigerant, which causes a rise in temperature, and the refrigerant flows out to a condenser outlet tube 34. The refrigerant then flows from the condenser outlet tube 34 through the heating solenoid valve 15 of a refrigerant return tube 35 into the accumulator tank 16, and after it is held in the accumulator tank 16, the refrigerant is drawn into the compressor 11 through a compressor suction tube 36, compressed by the compressor 11, and ejected through a refrigerant ejection tube 31.

Meanwhile, the cooling water flows through the water refrigerant heat exchanger 12 and the heater core 20 under the action of the cooling water pump 18 and is fed back to the cooling water pump 18. Specifically, the cooling water flows from a heat exchanger inlet tube 39 into the cooling water flow path 12*b* of the water refrigerant heat exchanger 12 under the action of the cooling water pump 18. The cooling water then flows from the cooling water flow path 12*b* through a heat exchanger outlet tube 40, the heater core inlet tube 42, the heater core 20, a heater core outlet tube 43, and a cooling water return tube 41 and is fed back to the cooling water pump 18. During the heating operation, the damper 54 is switched to block a gap between the heater core 20 and the duct 55 so that air coming from the fan 51 passes through the heater core 20.

The cooling water ejected from the cooling water pump 18, which has a low temperature, exchanges heat in the water refrigerant heat exchanger 12 with the high-temperature and high-pressure refrigerant, which causes a rise in temperature, and the cooling water then flows into the heater core 20 and exchanges heat in the heater core 20 with air coming from the fan 51, thereby heating the air. The cooling water having a lowered temperature is fed back to the cooling water pump 18. During the heating operation, as heat is exchanged in the water refrigerant heat exchanger 12 between the refrigerant and the cooling water in this manner, a drop in temperature of the refrigerant at the outlet of the refrigerant flow path 12*a* of the water refrigerant heat exchanger 12 is greater than that in temperature of the refrigerant at the inlet of the refrigerant flow path 12*a* of the water refrigerant heat exchanger 12. The water refrigerant heat exchanger 12 is a counterflow heat exchanger in which streams in the refrigerant flow path 12*a* and the cooling water flow path 12*b* flow in opposite directions. As such, the temperature of the cooling water at the outlet of the cooling water flow path 12*b* is slightly lower than the temperature of the refrigerant at the inlet side of the refrigerant flow path 12*a*. When the cooling water that has passed through the engine 50 does not flow into the heater core 20, the water temperature of the cooling water detected by the heater core inlet water temperature sensor 62 is the same as the temperature of the cooling water at the outlet of the cooling water flow path 12b. Therefore, when the cooling water that has passed through the engine 50 does not flow into the heater core 20, the water temperature of the cooling water detected by the heater core inlet water temperature sensor 62 is slightly lower than the temperature of the refrigerant at the inlet side of the refrigerant flow path 12a.

Referring to FIG. 3, how the refrigerant and the cooling water flow during the cooling operation will be described below. As illustrated in FIG. 3, during the cooling operation, the cooling solenoid valve 23 is open, the heating solenoid valve 15 is closed, and the heating expansion valve 13 is open. As illustrated by arrows in FIG. 3, the high-temperature and high-pressure refrigerant that has been compressed by the compressor 11 flows through the refrigerant ejection tube 31 into the refrigerant flow path 12a of the water refrigerant heat exchanger 12.

The refrigerant that has passed through the refrigerant flow path 12a of the water refrigerant heat exchanger 12 basically does not exchange heat in the water refrigerant heat exchanger 12, as will be described later. As such, although it passes through the water refrigerant heat exchanger 12, no drop in temperature occurs, and the refrigerant flows from the water refrigerant heat exchanger outlet tube 32 through the heating expansion valve 13 and the condenser inlet tube 33 into the condenser 14 with the temperature remaining high. In this process, as the heating expansion valve 13 is open, the refrigerant flows into the condenser 14 while remaining at a high temperature and at a high pressure. The refrigerant exchanges heat in the condenser 14 with outside air, lowering the temperature of the refrigerant, which condenses and flows from the condenser outlet tube 34 through the cooling solenoid valve 23 of an evaporator inlet tube 37 into the cooling expansion valve 22. After expansion in the cooling expansion valve 22, the refrigerant having a low temperature and low pressure flows into the evaporator 24. The refrigerant evaporates in the evaporator 24 as it exchanges heat with air that is blown by the fan 51, thereby cooling the air. When, during the cooling operation, the damper 54 is switched to block an air inlet of the heater core 20 so as to prevent the cooled air from flowing into the heater core 20, the air that has been cooled through the evaporator 24 is supplied to the vehicle cabin through the gap between the heater core 20 and the duct 55. The refrigerant that has evaporated in the evaporator 24 flows through an evaporator outlet tube 38 into the accumulator tank 16, and after it is held in the accumulator tank 16, the refrigerant is drawn into the compressor 11 through the compressor suction tube 36, compressed by the compressor 11, and ejected through the refrigerant ejection tube 31.

During the cooling operation, the cooling water basically is not fed back to the heater core 20, and heat exchange does not occur in the water refrigerant heat exchanger 12. However, when the refrigerant flowing into the refrigerant flow path 12a of the water refrigerant heat exchanger 12 has a high temperature, as illustrated by broken line arrows in FIG. 3, the cooling water is caused to cycle to the heater core 20 under the action of the cooling water pump 18 in a similar manner as during the heating operation, thereby cooling the refrigerant. In this process, the damper 54 is adjusted to allow air to flow into the heater core 20 in accordance with the amount of heat exchange in the heater core 20. In this case, the temperature of the cooling water at the inlet of the heater core 20 detected by the heater core inlet water temperature sensor 62 is slightly lower than the temperature of the refrigerant at the inlet of the refrigerant flow path 12a of the water refrigerant heat exchanger 12 in a similar manner as during the heating operation.

As described above, during the heating operation and when the cooling water flows into the heater core 20 during the cooling operation, the temperature of the cooling water at the inlet of the heater core 20 detected by the heater core inlet water temperature sensor 62 is slightly lower than the temperature of the refrigerant at the inlet of the refrigerant flow path 12a of the water refrigerant heat exchanger 12.

Figure 4:
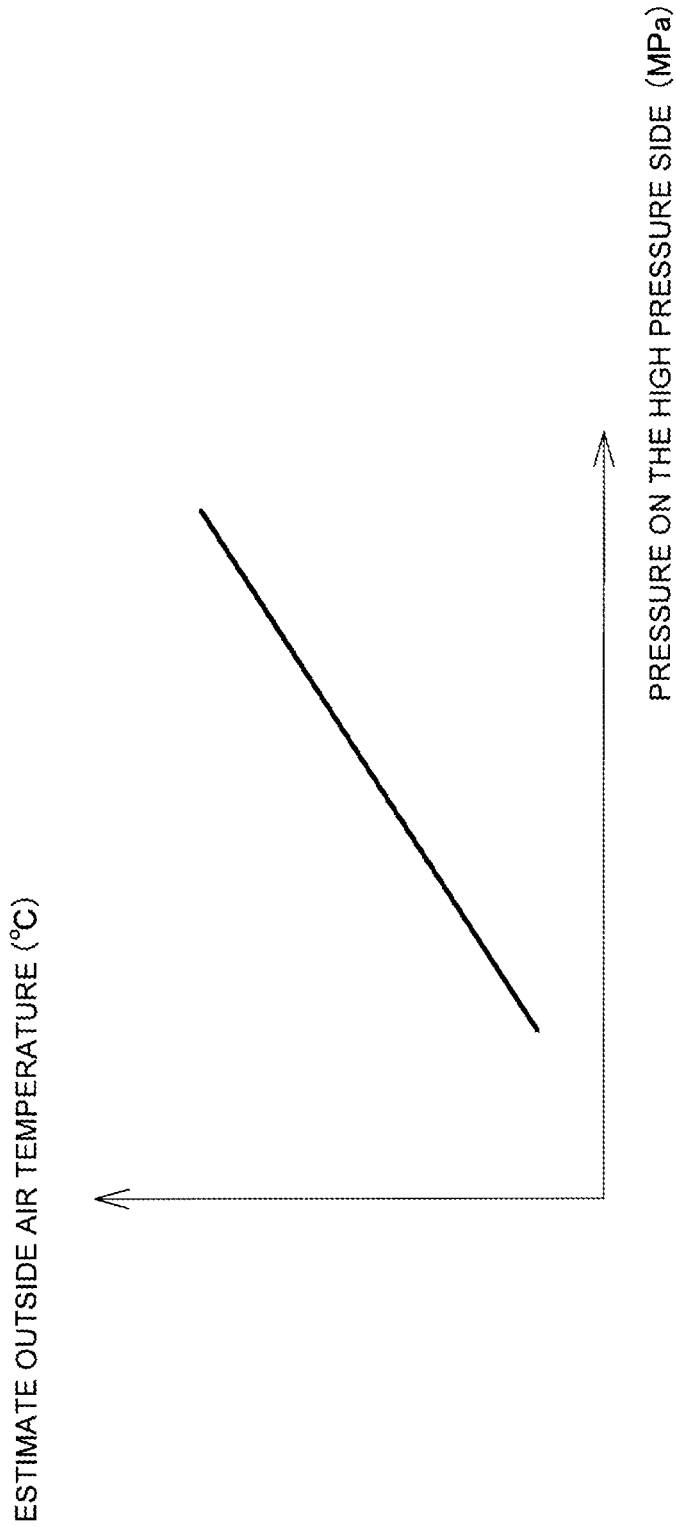
FIG. 4 is a first map that represents a relationship between a high pressure side pressure of an air conditioning cycle illustrated in FIG. 1 and an estimated outside air temperature.

Referring to FIG. 4, a relationship between a high pressure side pressure detected by the high pressure side pressure sensor 61 and an outside air temperature will be described below. During the heating operation, the high pressure side pressure depends on the amount of heat absorbed from outside air in the condenser 14 and power consumption of the compressor 11. When the vehicle is stopped with the amount of air flowing into the condenser 14 being constant and the power consumption of the compressor 11 being constant, the high pressure side pressure depends on the outside air temperature. Specifically, the higher the outside air temperature and the greater the heat absorption from outside air in the condenser 14, the higher the high pressure side pressure, whereas the lower the outside air temperature and the less the heat absorption from outside air in the condenser 14, the lower will be the high pressure side pressure.

During the cooling operation, the high pressure side pressure of the heat pump cycle 10 depends on the saturation pressure of the condenser 14. The saturation pressure of the condenser 14 depends on the temperature of outside air with which heat is exchanged; the higher the outside air temperature the higher the high pressure side pressure, whereas the lower the outside air temperature the lower will be the high pressure side pressure.

As the high pressure side pressure of the heat pump cycle 10 and the outside air temperature have a certain correlation relationship that, as described above, as the outside air temperature rises, the high pressure side pressure increases, the outside air temperature can be estimated based on the high pressure side pressure detected by the high pressure side pressure sensor 61.

Therefore, the vehicle air conditioning device 100 stores, in the memory 72 of the air conditioning controller 70, a first map that represents a relationship between the high pressure side pressure detected by the high pressure side pressure sensor 61 and the estimated outside air temperature as illustrated in FIG. 4. It should be noted that FIG. 4 provides an example of the first map, and the memory 72 may separately store therein a map that represents a relationship between the high pressure side pressure and the estimated outside air temperature during the cooling operation and a map that represents a relationship between the high pressure side pressure and the estimated outside air temperature during the heating operation. The memory 72 may also store therein a plurality of maps that are created in accordance with, for example, the power consumption of the compressor 11 during the heating operation or the vehicle traveling speed.

However, there is a problem in that the estimate is of insufficient accuracy when the outside air temperature is estimated based on the high pressure side pressure. Therefore, the vehicle air conditioning device 100 according to an embodiment corrects the estimated outside air temperature using another parameter that is correlated with the outside air temperature, thereby improving the accuracy of estimation of the outside air temperature.

Figure 5:
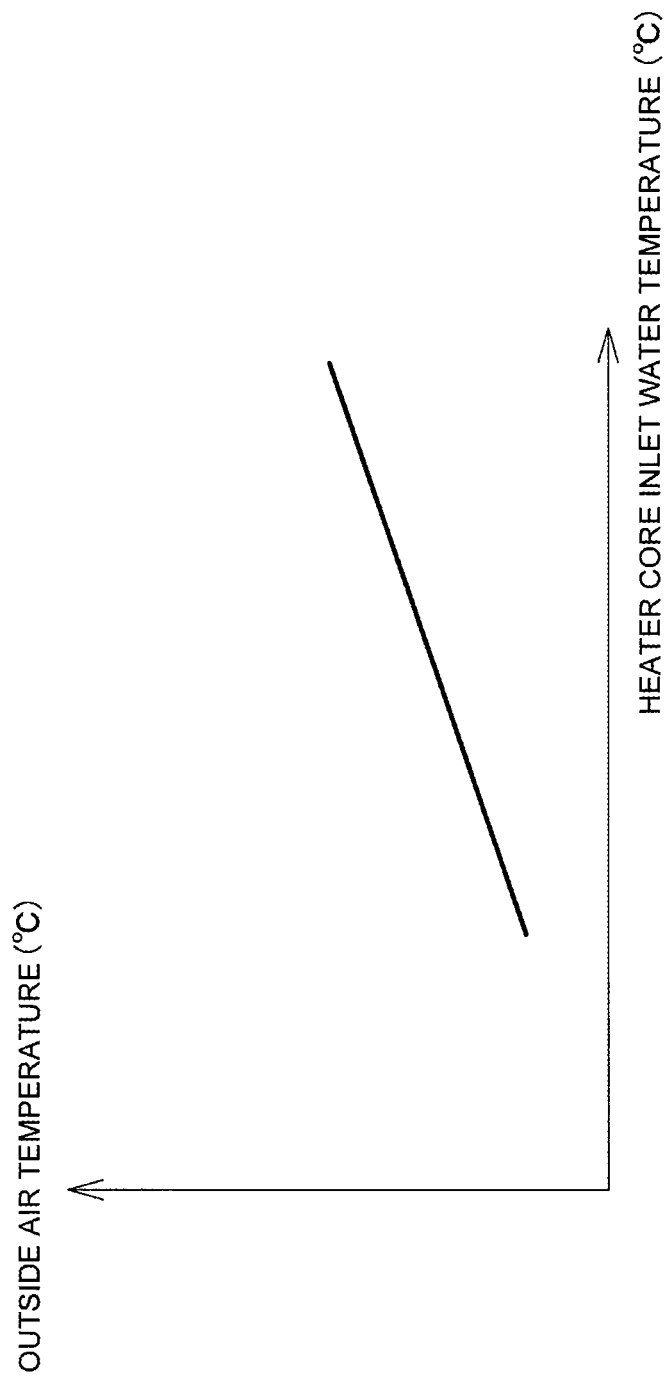
FIG. 5 is a graph that represents a relationship between a heater core inlet water temperature and an outside air temperature.

During the heating operation, as the outside air temperature increases, the high pressure side pressure increases. As the high pressure side pressure increases, the refrigerant temperature at the outlet of the compressor 11 increases, and the refrigerant temperature at the inlet of the refrigerant flow path 12a of the water refrigerant heat exchanger 12 increases. During the heating operation, the temperature of the cooling water at the inlet of the heater core 20 is slightly lower than the temperature of the refrigerant at the inlet of the refrigerant flow path 12a of the water refrigerant heat exchanger 12. Therefore, during the heating operation, as the outside air temperature increases, the temperature of the cooling water at the inlet of the heater core 20 increases. As such, as illustrated in FIG. 5, a correlation relationship is present between the outside air temperature and the heater core inlet water temperature that as the outside air temperature increases, the heater core inlet water temperature rises. A correlation relationship is also present when the cooling water flows into the heater core 20 during the cooling operation that as the outside air temperature increases, the heater core inlet water temperature rises in a similar manner as during the heating operation.

Figure 6:
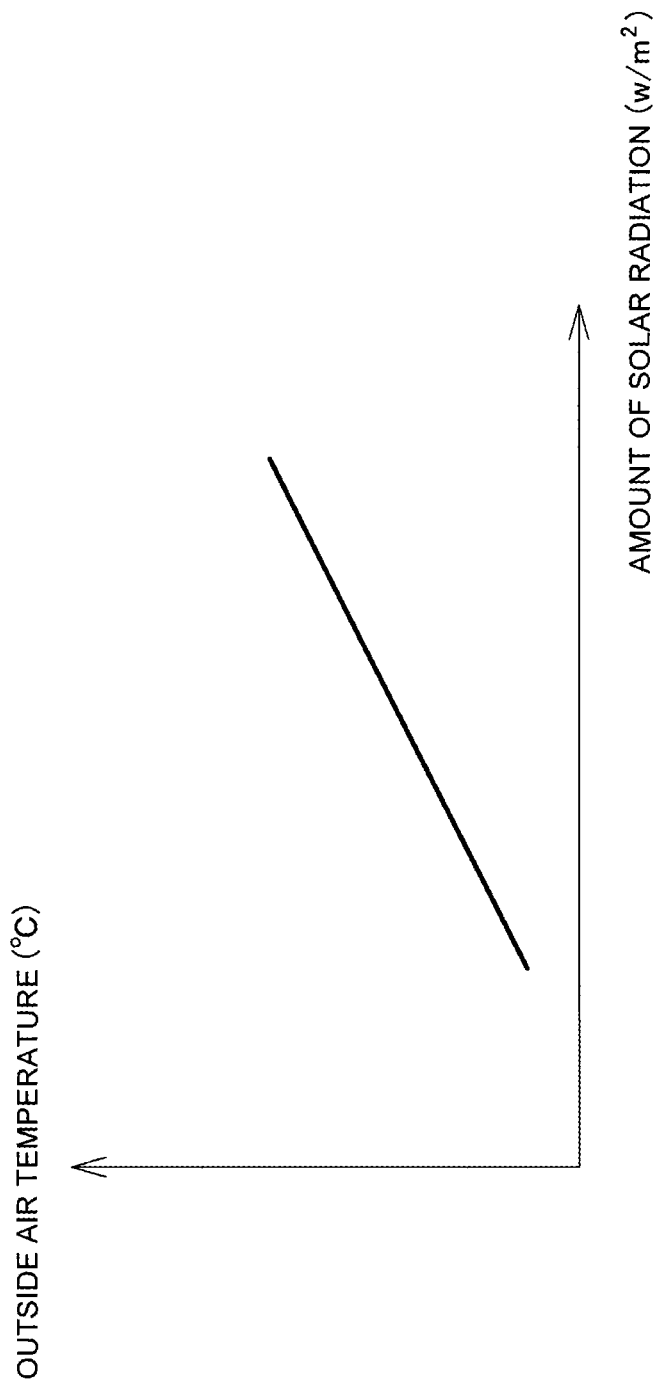
FIG. 6 is a graph that represents a relationship between an amount of solar radiation and an outside air temperature.

A correlation relationship is also present between an amount of solar radiation and an outside air temperature that, as illustrated in FIG. 6, as the amount of solar radiation increases, the outside air temperature increases.

In consideration of the above, during the heating operation and when the cooling water flows into the heater core 20 during the cooling operation, the vehicle air conditioning device 100 calculates an estimated outside air temperature based on the high pressure side pressure, the heater core inlet water temperature, and the amount of solar radiation that are correlated with the outside air temperature, as follows:

$$\text{Estimated outside air temperature} = f1(\text{high pressure side pressure}) + Kb \times \text{heater core inlet water temperature} + Kc \times \text{amount of solar radiation} \quad \text{(Equation 1)}$$

where f1 is a function of the first map illustrated in FIG. 4, which is a function for calculating an estimated outside air temperature based on the high pressure side pressure detected by the high pressure side pressure sensor 61.

Figure 7:
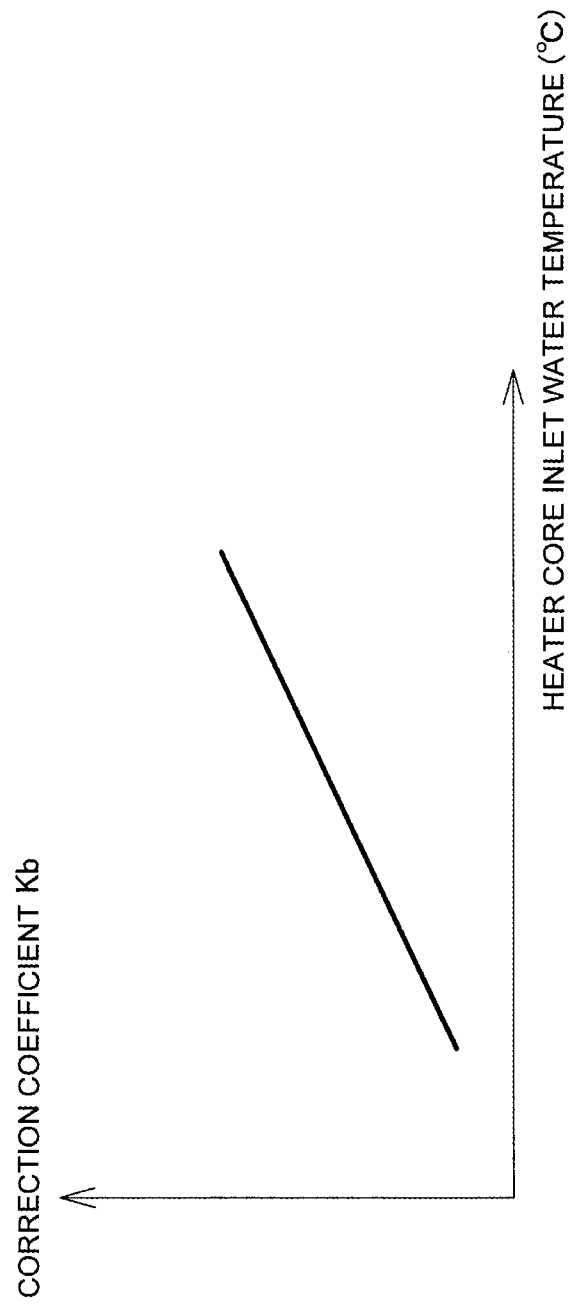
FIG. 7 is a second map for converting the heater core inlet water temperature to a first correction outside air temperature.

The coefficient Kb is a coefficient for converting the heater core inlet water temperature (° C.) detected by the heater core inlet water temperature sensor 62 to a first correction outside air temperature. The coefficient Kb may be defined as a second map such that as the heater core inlet water temperature increases, the coefficient Kb is greater as illustrated in, for example, FIG. 7. The vehicle air conditioning device 100 according to an embodiment stores the second map illustrated in FIG. 7 in the memory 72 of the air conditioning controller 70, and calculates a first correction outside air temperature using this map.

Figure 8:
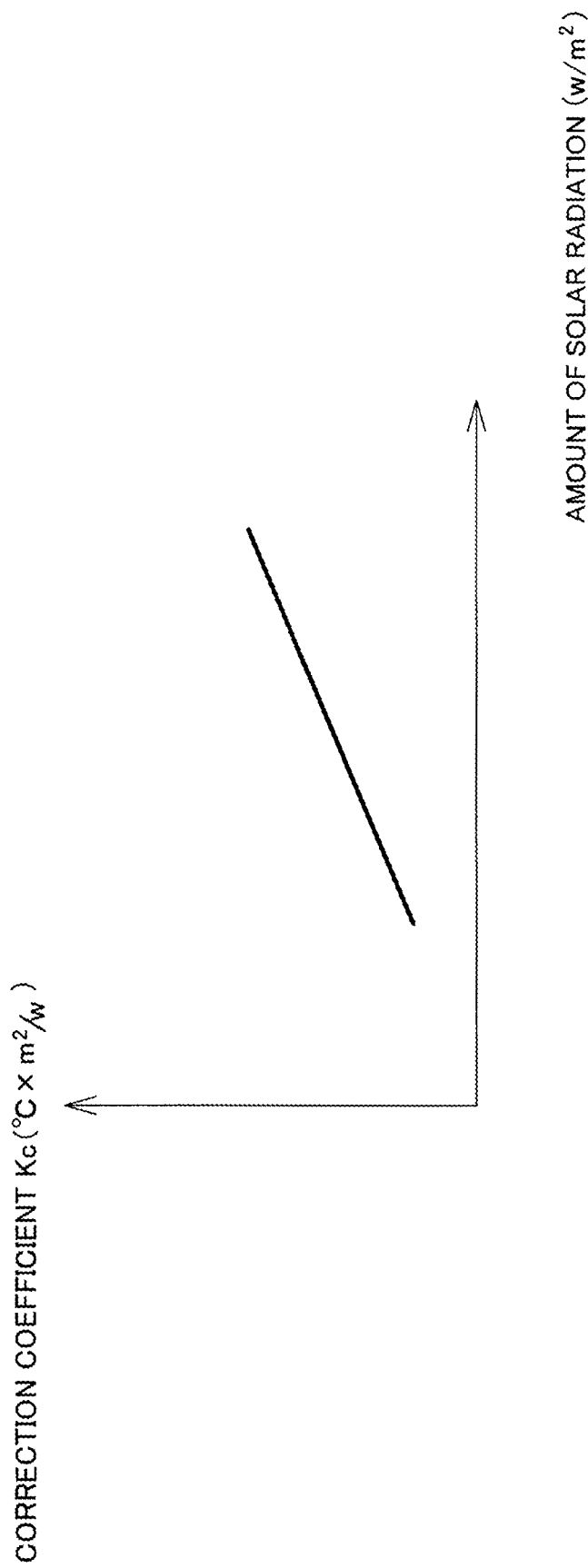
FIG. 8 is a third map for converting the amount of solar radiation to a second correction outside air temperature.

The coefficient Kc is a coefficient for converting the amount of solar radiation (w/m$^2$) to a second correction outside air temperature. The unit of the coefficient Kc is (° C.×m$^2$/w). The coefficient Kc may be defined as a third map such that as the amount of solar radiation increases, the coefficient Kc is greater as illustrated in, for example, FIG. 8. The vehicle air conditioning device 100 according to an embodiment stores the third map illustrated in FIG. 8 in the memory 72 of the air conditioning controller 70, and calculates a second correction outside air temperature using this third map in a similar manner as for the coefficient Kb.

As described above, during the heating operation and when the cooling water flows into the heater core 20 during the cooling operation, the vehicle air conditioning device 100 calculates an estimated outside air temperature according to Equation 1 based on the high pressure side pressure, the heater core inlet water temperature, and the amount of solar radiation that are correlated with the outside air temperature, thereby enabling accurately calculating the estimated outside air temperature.

On the other hand, when the cooling water does not flow into the heater core 20 during the cooling operation, as there is no correlation relationship between the outside air temperature and the heater core inlet water temperature, the estimated outside air temperature is calculated according to the following Equation 2 with no consideration given to the first correction outside air temperature calculated using the heater core inlet water temperature:

$$\text{Estimated outside air temperature} = f1(\text{high pressure side pressure}) + Kc \times \text{amount of solar radiation} \quad \text{(Equation 2)}$$

In this case, although the estimation accuracy is lower than when an estimated outside air temperature is calculated using Equation 1, the estimation accuracy is improved compared to when an estimated outside air temperature is calculated based only on the high pressure side pressure.

As described above, the vehicle air conditioning device 100 calculates an estimated outside air temperature according to either Equation 1 based on the high pressure side pressure, the heater core inlet water temperature, and the amount of solar radiation that are correlated with the outside air temperature or Equation 2 based on the high pressure side pressure and the amount of solar radiation that are correlated with the outside air temperature, thereby enabling accurately calculating the estimated outside air temperature.

An operation of the air conditioning controller 70 of the vehicle air conditioning device 100 according to an embodiment will be described below, but first a manner in which the air conditioning controller 70 updates the outside air temperature held therein with the outside air temperature detected by the outside air temperature sensor 63 will be described.

The outside air temperature sensor 63 is disposed more toward the front of the vehicle than the condenser 14 in the front compartment (not illustrated) that houses a powertrain including the engine 50 and the motor. Therefore, when the vehicle travels at a certain speed, as there is an airflow past the outside air temperature sensor 63, the outside air temperature sensor 63 can accurately detect the outside air temperature. Therefore, when the vehicle travels at a certain speed, the air conditioning controller 70 updates the outside air temperature, determining the temperature detected by the outside air temperature sensor 63 to be accurate.

However, when the vehicle is stopped with no airflow as would occur were the vehicle traveling, or when the vehicle is traveling at a low speed, hot air generated by heat from the engine 50, the motor, and other components flows to the location where the outside air temperature sensor 63 is disposed, which is more toward the front of the vehicle than the condenser 14, and the outside air temperature sensor 63 may detect a temperature higher than the actual outside air temperature. Therefore, when the temperature detected by the outside air temperature sensor 63 rises while the vehicle is stopped or traveling at low speed, the air conditioning controller 70 does not update the outside air temperature, determining that the temperature detected by the outside air temperature sensor 63 is inaccurate, and the air conditioning controller 70 maintains the temperature detected by the outside air temperature sensor 63 when the start switch 65 was turned on as the outside air temperature.

However, when the temperature detected by the outside air temperature sensor 63 drops, even while the vehicle is stopped or traveling at low speed, the air conditioning controller 70 updates the outside air temperature, determining that no hot air is coming and the temperature detected by the outside air temperature sensor 63 is accurate.

When, as described above, the air conditioning controller 70 does not update the value for outside air temperature held therein with the outside air temperature detected by the outside air temperature sensor 63, the actual outside air temperature may significantly differ from the outside air temperature held by the air conditioning controller 70. For example, when the vehicle is parked overnight with the powertrain operating after the start switch 65 is turned on at a low outside air temperature during nighttime hours, the temperature detected by the outside air temperature sensor 63 gradually rises under the influence of heat coming from components mounted in the front compartment. Therefore, the air conditioning controller 70 does not update the outside air temperature held therein with the outside air temperature detected by the outside air temperature sensor 63, but maintains the lower temperature detected when the start switch 65 was turned on as the outside air temperature.

As the actual outside air temperature rises the next morning, the temperature detected by the outside air temperature sensor 63 also rises. Still, as the vehicle remains stopped, the air conditioning controller 70 does not update the outside air temperature held therein with the outside air temperature detected by the outside air temperature sensor 63 and continues to maintain the low temperature detected when the start switch 65 was turned on, as the outside air temperature. A difference therefore arises between the outside air temperature held by the air conditioning controller 70 and the actual outside air temperature.

When, as described above, the air conditioning controller 70 does not update the outside air temperature held therein with the outside air temperature detected by the outside air temperature sensor 63, performing air conditioning control based on the outside air temperature held by the air conditioning controller 70 could in some instances impair user comfort or cause a reduction in fuel efficiency due to the difference between the actual outside air temperature and the outside air temperature held by the air conditioning controller 70.

On the other hand, when the air conditioning controller 70 updates the outside air temperature held therein with the outside air temperature detected by the outside air temperature sensor 63, as the temperature detected by the outside air temperature sensor 63 is accurate, performing air conditioning control based on the updated outside air temperature will not impair user comfort or reduce fuel efficiency.

In consideration of the above, in the vehicle air conditioning device 100 according to an embodiment, when the outside air temperature is updated with the outside air temperature detected by the outside air temperature sensor 63 at regular predetermined intervals, the air conditioning controller 70 adjusts the temperature or the flow rate of air that is to be blown into the vehicle cabin based on the updated outside air temperature, and when the outside air temperature is not updated with the outside air temperature detected by the outside air temperature sensor 63 and the vehicle traveling speed is lower than a predetermined threshold value, the air conditioning controller 70 adjusts the temperature or the flow rate of air that is to be blown into the vehicle cabin based on the calculated estimated outside air temperature. This makes it possible to avoid impairment of user comfort and to suppress reduction in fuel efficiency.

Figure 9:
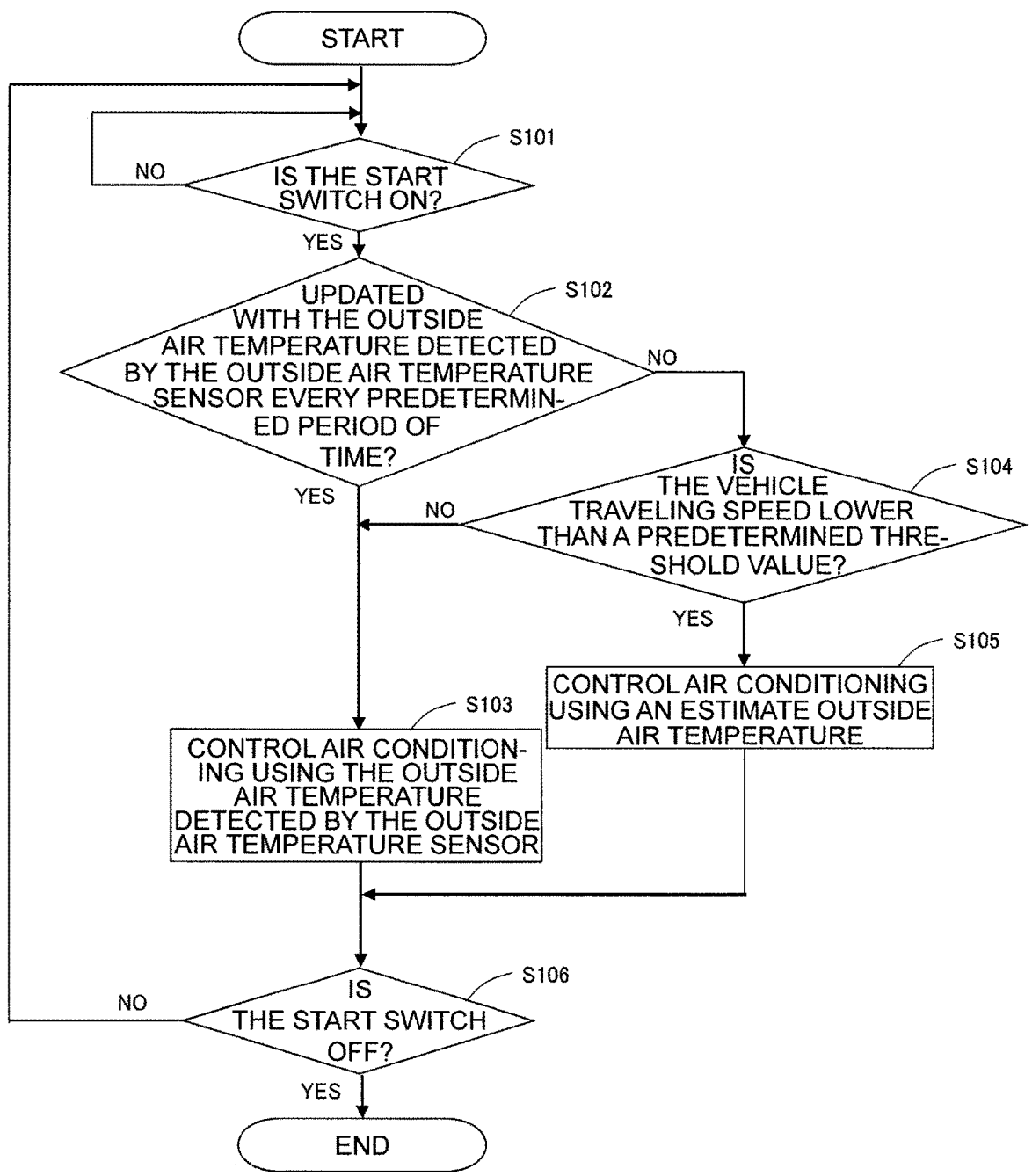
FIG. 9 is a flowchart that illustrates an operation of the vehicle air conditioning device illustrated in FIG. 1.

Referring to FIG. 9, an operation of the air conditioning controller 70 of the vehicle air conditioning device 100 will be described below. In an initial state, the vehicle is stopped, and the start switch 65 is off. As illustrated at step S101 in FIG. 9, the CPU 71 of the air conditioning controller 70 waits until information indicating that the start switch 65 has been turned on is input from the ECU 75. After information indicating that the start switch 65 has been turned on is input from the ECU 75, it is determined YES at step S101 in FIG. 9, and the process proceeds to step S102 in FIG. 9. At step S102 in FIG. 9, the CPU 71 determines whether or not the outside air temperature has been updated with the outside air temperature input from the outside air temperature sensor 63 every predetermined period of time.

As described earlier, when the air conditioning controller 70 continues to update the outside air temperature with the outside air temperature detected by the outside air temperature sensor 63, performing air conditioning control based on the updated outside air temperature will not impair user comfort or reduce fuel efficiency because the control is based on the accurate temperature detected by the outside air temperature sensor 63. Therefore, when it is determined YES at step S102 in FIG. 9, the process proceeds to step S103 in FIG. 9, and the CPU 71 of the air conditioning controller 70 adjusts the temperature or the flow rate of air that is to be blown into the vehicle cabin based on the outside air temperature detected by the outside air temperature sensor 63.

On the other hand, when the air conditioning controller 70 does not keep updating the outside air temperature with the outside air temperature detected by the outside air temperature sensor 63, performing air conditioning control based on the outside air temperature held by the air conditioning controller 70 may impair user comfort or cause a reduction in fuel efficiency if a difference between the actual outside air temperature and the outside air temperature held by the air conditioning controller 70 arises. Therefore, when it is determined NO at step S102 in FIG. 9, the process proceeds to step S104 in FIG. 9, and the CPU 71 determines whether or not the traveling speed of the vehicle is lower than a predetermined threshold value. Vehicle traveling speed information is input from the vehicle speed meter 66 illustrated in FIG. 1 to the ECU 75 and is output from the ECU 75 to the CPU 71.

The predetermined threshold value for the traveling speed of the vehicle may be freely set, and may be set to, for example, about 1 to 2 km per hour (km/h). Alternatively, step S104 may determine whether or not the vehicle is in a stopped state. When it is determined NO at step S104 in FIG. 9, as the vehicle is in a traveling state, it is determined that the outside air temperature will be updated with the outside air temperature detected by the outside air temperature sensor 63 in a short period of time, the process proceeds to step S103 in FIG. 9, and the CPU 71 adjusts the temperature or the flow rate of air that is to be blown into the vehicle cabin based on the outside air temperature detected by the outside air temperature sensor 63.

On the other hand, when it is determined YES at step S104 in FIG. 9, as the vehicle is in a stopped state, it is determined that the outside air temperature will not be updated with the outside air temperature detected by the outside air temperature sensor 63 after a short period of time, the process proceeds to step S105 in FIG. 9, and the CPU 71 calculates an estimated outside air temperature using Equation 1 or Equation 2 described earlier, and adjusts the temperature or the flow rate of air that is to be blown into the vehicle cabin based on the calculated estimated outside air temperature.

After the operation of step S103 or S105 in FIG. 9, the process proceeds to step S106, and the CPU 71 determines whether or not the start switch 65 has been turned off, and repeats the operation of steps S101 through S105 in FIG. 9 until the start switch 65 is turned off.

As described above, the air conditioning controller 70 of the vehicle air conditioning device 100 according to this embodiment calculates an estimated outside air temperature according to either Equation 1 based on the high pressure side pressure, the heater core inlet water temperature, and the amount of solar radiation that are correlated with the outside air temperature, or Equation 2 based on the high pressure side pressure and the amount of solar radiation that are correlated with the outside air temperature. This makes it possible to obtain an accurate estimate of outside air temperature.

When the outside air temperature is not updated with the outside air temperature detected by the outside air temperature sensor 63 which has been determined to be inaccurate, the air conditioning controller 70 of the vehicle air conditioning device 100 according to this embodiment adjusts the temperature or the flow rate of air that is to be blown into the vehicle cabin based on the estimated outside air temperature calculated using Equation 1 or Equation 2 rather than the outside air temperature detected by the outside air temperature sensor 63, thereby enabling air conditioning control that avoids impairment of user comfort and that suppresses a reduction in fuel efficiency even when the outside air temperature detected by the outside air temperature sensor 63 is determined to be inaccurate.

Although, in the foregoing description, during the heating operation and when the cooling water flows into the heater core 20 during the cooling operation, the air conditioning controller 70 calculates an estimated outside air temperature according to Equation 1 based on the high pressure side pressure, the heater core inlet water temperature, and the amount of solar radiation that are correlated with the outside air temperature, the present disclosure is not limited to this example, and the estimated outside air temperature may be calculated according to the following Equation 3 based on the high pressure side pressure and the heater core inlet water temperature:

$$\text{Estimated outside air temperature} = f1(\text{high pressure side pressure}) + Kb \times \text{heater core inlet water temperature} \quad \text{(Equation 3)}$$

In this case, although the estimation accuracy is lower than when an estimated outside air temperature is calculated using Equation 1, the estimation accuracy can be improved compared to when an estimated outside air temperature is calculated based only on the high pressure side pressure.

Figure 10:
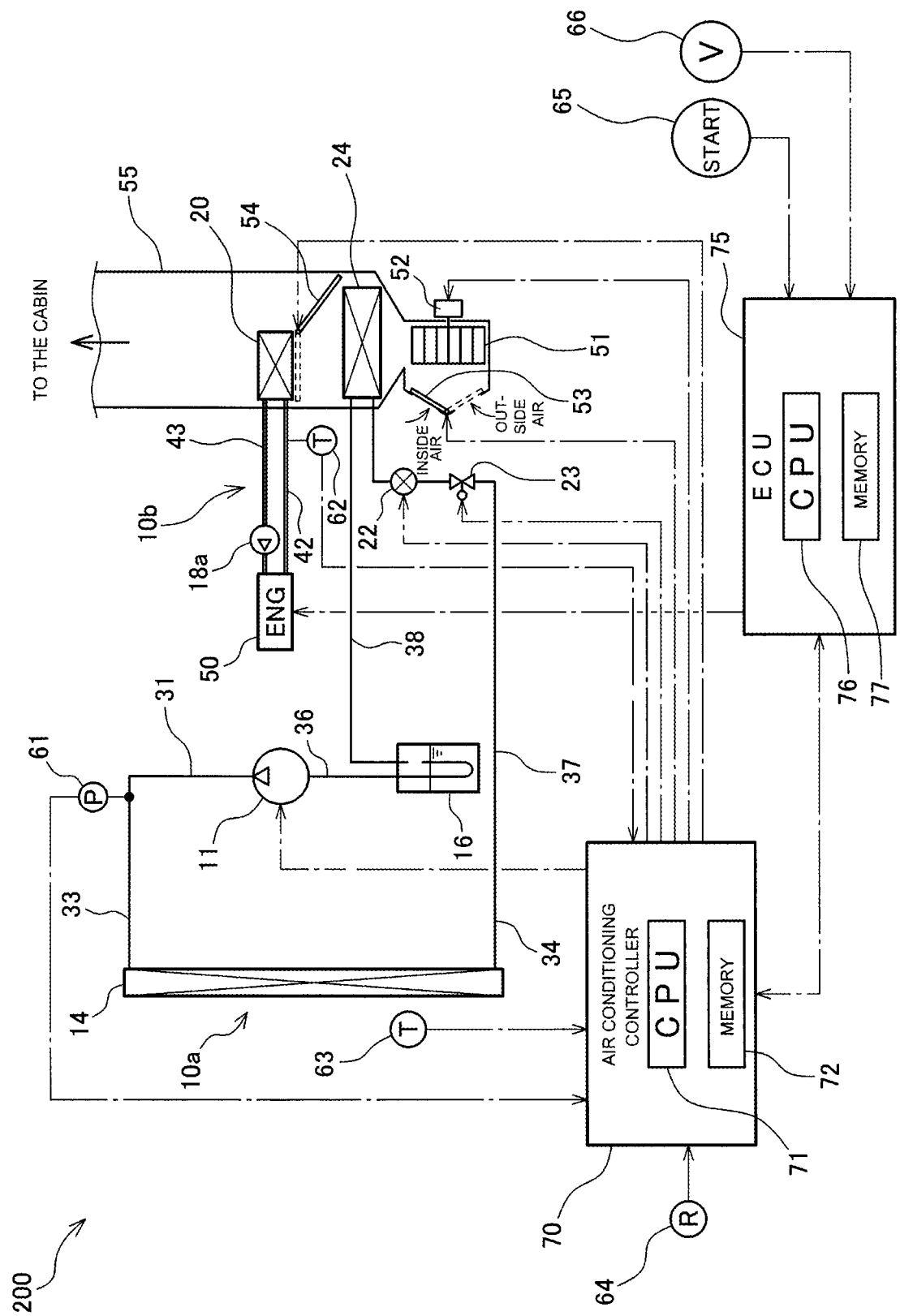
FIG. 10 is a schematic diagram that illustrates a vehicle air conditioning device according to another embodiment.
Figure 11:
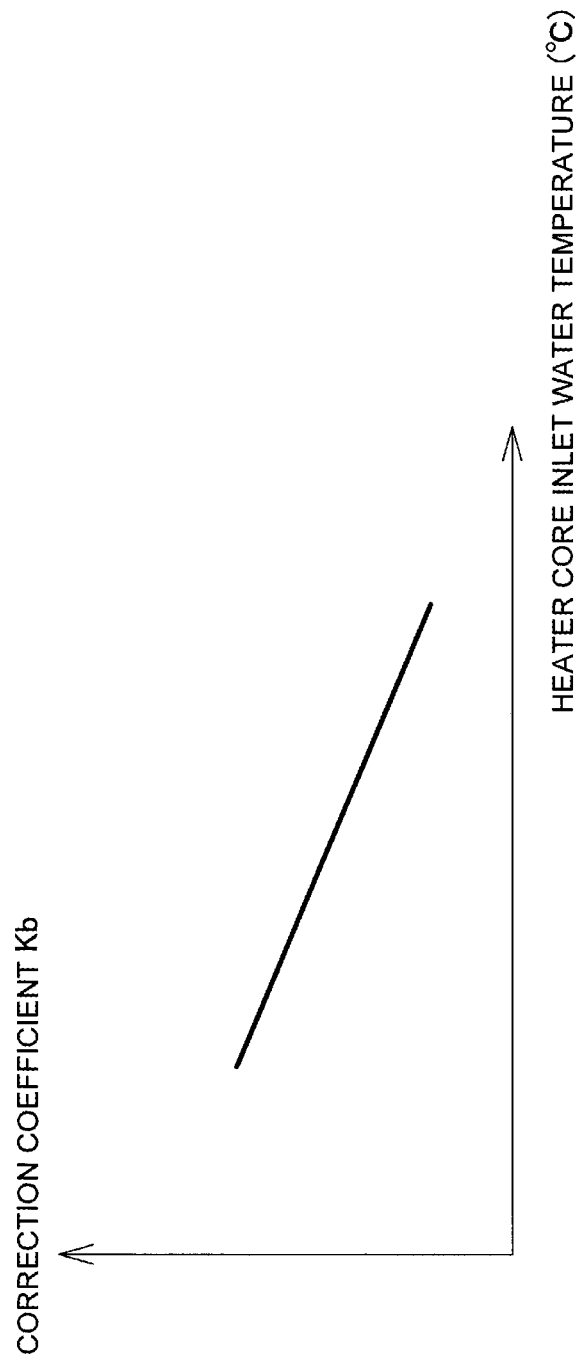
FIG. 11 is a second map for converting the heater core inlet water temperature to a first correction outside air temperature during a heating operation in the vehicle air conditioning device illustrated in FIG. 10.

Referring to FIGS. 10 and 11, a vehicle air conditioning device 200 according to another embodiment will be described below. Similar reference numerals denote portions similar to those of the vehicle air conditioning device 100 described above with reference to FIGS. 1 to 9, and their description is not repeated here. The air conditioning cycle of the vehicle air conditioning device 200 includes a cooling cycle 10a and a heating cycle 10b.

The cooling cycle 10a causes the refrigerant that has been compressed by the compressor 11 to exchange heat in the condenser 14 with outside air to condense, to expand in the cooling expansion valve 22, and then to evaporate in the evaporator 24, thereby cooling the air that is to be introduced into the interior. The refrigerant exiting the evaporator 24 returns to the compressor 11 through the accumulator tank 16. During the cooling operation, the damper 54 is switched to block the air inlet of the heater core 20 so as to prevent the cooled air from flowing into the heater core 20. The compressor 11 of the cooling cycle 10a is operated only during the cooling operation, and during the heating operation, the compressor 11 stops, and the refrigerant does not cycle through the cooling cycle 10a.

The heating cycle 10b, which is another cycle that is separate from the cooling cycle 10a, includes a cooling water pump 18a for transporting the cooling water from the engine 50 to the heater core 20 and the heater core 20 through which the cooling water circulates. During the heating operation, the damper 54 is switched to block a gap between the heater core 20 and the duct 55 so that air coming from the fan 51 passes through the heater core 20. The vehicle air conditioning device 200 differs from the above-described vehicle air conditioning device 100 that includes the heat pump cycle 10 in that a certain amount of cooling water flows through the heater core 20 even during the cooling operation. At this time, the damper 54 is switched to block the air inlet of the heater core 20.

In the vehicle air conditioning device 200 illustrated in FIG. 10, during the cooling operation in which the compressor 11 is operated, the cooling water flows through the heater core 20. The vehicle air conditioning device 200 has a characteristic in that, during the cooling operation, an increase in outside air temperature results in an increase in temperature of the cooling water at the inlet of the heater core 20. Therefore, during the cooling operation, an estimated outside air temperature is calculated according to either Equation 1 or Equation 3 in a similar manner as in the above-described vehicle air conditioning device 100.

However, in the vehicle air conditioning device 200 illustrated in FIG. 10, during the heating operation in which the compressor 11 is not operated, the outside air temperature cannot be estimated based on the high pressure side pressure. The vehicle air conditioning device 200 has a characteristic in that, during the heating operation, the lower the outside air temperature, the higher the temperature of the cooling water supplied from the engine 50, and the higher the outside air temperature, the lower the temperature of the cooling water. In consideration of the above, during the heating operation, based on such a correlation between the outside air temperature and the cooling water temperature, the outside air temperature can be estimated based on the heater core inlet water temperature using a second map such that as the heater core inlet water temperature increases, the coefficient Kb is smaller as illustrated in FIG. 11.

In the vehicle air conditioning device 200, during the heating operation, the outside air temperature is estimated according to the following Equation 4 based on the cooling water temperature and the amount of solar radiation:

$$\text{Estimated outside air temperature} = Kb \times \text{heater core inlet water temperature} + Kc \times \text{amount of solar radiation} \quad \text{(Equation 4)}$$

In the vehicle air conditioning device 200, as illustrated in the flowchart in FIG. 9 and in a similar manner as in the vehicle air conditioning device 100, when the outside air temperature is updated with the outside air temperature detected by the outside air temperature sensor 63 every predetermined period of time, the air conditioning controller 70 adjusts the temperature or the flow rate of air that is to be blown into the vehicle cabin based on the updated outside air temperature, and when the outside air temperature is not updated with the outside air temperature detected by the outside air temperature sensor 63 and the vehicle traveling speed is lower than a predetermined threshold value, the air conditioning controller 70 adjusts the temperature or the flow rate of air that is to be blown into the vehicle cabin based on the calculated estimated outside air temperature. This makes it possible to avoid impairing user comfort and to suppress a reduction in fuel efficiency.

Although, in the above-described embodiments, the air conditioning controller 70 and the ECU 75 respectively include the CPU 71 and the CPU 76 as processors, the present disclosure is not limited to these examples. Instead of the CPUs 71 and 76, for example, GPUs, ASICs, FPGAs, or programmable logic devices may be used as processors. The operation of each of the processors in the above-described embodiments is not only implemented by a single processor but may also be implemented by a plurality of cooperating processors that are located at physically different locations from each other.

The invention claimed is:

1. A vehicle air conditioning device, comprising:
   an air conditioning cycle configured to compress and expand a refrigerant, the air conditioning cycle comprising:
      a compressor configured to compress the refrigerant;
      an exterior heat exchanger through which the refrigerant circulates;
      an interior heat exchanger through which the refrigerant circulates; and
      an expansion valve configured to expand the compressed refrigerant;
   a heater core through which a second refrigerant circulates, the heater core being configured to heat air that is to be supplied to a vehicle cabin;
   a high pressure side pressure sensor configured to detect a pressure on the high pressure side of the air conditioning cycle;
   a heater core inlet refrigerant temperature sensor configured to detect a temperature of the second refrigerant at an inlet of the heater core as a heater core inlet refrigerant temperature; and
   a solar radiation sensor configured to detect an amount of solar radiation,
   wherein an estimated outside air temperature is calculated based on the high pressure side pressure of the air conditioning cycle detected by the high pressure side pressure sensor, the heater core inlet refrigerant temperature detected by the heater core inlet refrigerant temperature sensor, and the amount of solar radiation detected by the solar radiation sensor.

2. The vehicle air conditioning device according to claim 1, comprising:
   a first map that represents a relationship between the high pressure side pressure detected by the high pressure side pressure sensor and an outside air temperature;
   a second map for converting the heater core inlet refrigerant temperature detected by the heater core inlet refrigerant temperature sensor to a first correction outside air temperature; and
   a third map for converting the amount of solar radiation detected by the solar radiation sensor to a second correction outside air temperature,
   wherein the estimated outside air temperature is calculated based on the outside air temperature calculated using the first map, the first correction outside air temperature calculated using the second map, and the second correction outside air temperature calculated using the third map.

3. The vehicle air conditioning device according to claim 1, comprising:
   an outside air temperature sensor configured to detect an outside air temperature,
   wherein, when an outside air temperature is updated with the outside air temperature detected by the outside air temperature sensor every predetermined period of time, a temperature or a flow rate of air that is to be blown into the vehicle cabin is adjusted based on the updated outside air temperature, and
   wherein, when the outside air temperature is not updated with the outside air temperature detected by the outside air temperature sensor and a vehicle traveling speed is lower than a predetermined threshold value, the temperature or the flow rate of air that is to be blown into the vehicle cabin is adjusted based on the calculated estimated outside air temperature.

4. The vehicle air conditioning device according to claim 2, comprising:
   an outside air temperature sensor configured to detect an outside air temperature,
   wherein, when an outside air temperature is updated with the outside air temperature detected by the outside air temperature sensor every predetermined period of time, a temperature or a flow rate of air that is to be blown into the vehicle cabin is adjusted based on the updated outside air temperature, and
   wherein, when the outside air temperature is not updated with the outside air temperature detected by the outside air temperature sensor and a vehicle traveling speed is lower than a predetermined threshold value, the temperature or the flow rate of air that is to be blown into the vehicle cabin is adjusted based on the calculated estimated outside air temperature.

5. A vehicle air conditioning device, comprising:
   an air conditioning cycle configured to compress and expand a refrigerant, the air conditioning cycle comprising:
      a compressor configured to compress the refrigerant;
      an exterior heat exchanger through which the refrigerant circulates;
      an interior heat exchanger through which the refrigerant circulates; and
      an expansion valve configured to expand the compressed refrigerant;
   a heater core through which a second refrigerant circulates, the heater core being configured to heat air that is to be supplied to a vehicle cabin;
   a high pressure side pressure sensor configured to detect a pressure on the high pressure side of the air conditioning cycle;
   a heater core inlet refrigerant temperature sensor configured to detect a temperature of the second refrigerant at an inlet of the heater core as a heater core inlet refrigerant temperature;
   a first map that represents a relationship between the high pressure side pressure detected by the high pressure side pressure sensor and an outside air temperature; and
   a second map for converting the heater core inlet refrigerant temperature detected by the heater core inlet refrigerant temperature sensor to a first correction outside air temperature,
   wherein an estimated outside air temperature is calculated based on the outside air temperature calculated using the first map and the first correction outside air temperature calculated using the second map.

6. The vehicle air conditioning device according to claim 5, comprising:
an outside air temperature sensor configured to detect an outside air temperature,
wherein, when an outside air temperature is updated with the outside air temperature detected by the outside air temperature sensor every predetermined period of time, a temperature or a flow rate of air that is to be blown into the vehicle cabin is adjusted based on the updated outside air temperature, and
wherein, when the outside air temperature is not updated with the outside air temperature detected by the outside air temperature sensor and a vehicle traveling speed is lower than a predetermined threshold value, the temperature or the flow rate of air that is to be blown into the vehicle cabin is adjusted based on the calculated estimated outside air temperature.

7. A vehicle air conditioning device, comprising:
an air conditioning cycle configured to compress and expand a refrigerant, the air conditioning cycle comprising:
a compressor configured to compress the refrigerant;
an exterior heat exchanger through which the refrigerant circulates;
an interior heat exchanger through which the refrigerant circulates; and
an expansion valve configured to expand the compressed refrigerant;
a heater core through which a second refrigerant circulates, the heater core being configured to heat air that is to be supplied to a vehicle cabin;
a high pressure side pressure sensor configured to detect a pressure on the high pressure side of the air conditioning cycle; and
a heater core inlet refrigerant temperature sensor configured to detect a temperature of the second refrigerant at an inlet of the heater core as a heater core inlet refrigerant temperature; and
an outside air temperature sensor configured to detect an outside air temperature,
wherein an estimated outside air temperature is calculated based on the high pressure side pressure of the air conditioning cycle detected by the high pressure side pressure sensor and the heater core inlet refrigerant temperature detected by the heater core inlet refrigerant temperature sensor,
wherein, when an outside air temperature is updated with the outside air temperature detected by the outside air temperature sensor every predetermined period of time, a temperature or a flow rate of air that is to be blown into the vehicle cabin is adjusted based on the updated outside air temperature, and
wherein, when the outside air temperature is not updated with the outside air temperature detected by the outside air temperature sensor and a vehicle traveling speed is lower than a predetermined threshold value, the temperature or the flow rate of air that is to be blown into the vehicle cabin is adjusted based on the calculated estimated outside air temperature.

* * * * *